(12) United States Patent
Kuwata

(10) Patent No.: US 7,281,087 B2
(45) Date of Patent: Oct. 9, 2007

(54) DISK ARRAY DEVICE MANAGING CACHE MEMORY BY DIVIDING CACHE MEMORY INTO A PLURALITY OF CACHE SEGMENTS

(75) Inventor: Atsushi Kuwata, Tokyo (JP)

(73) Assignee: NEC Corporation, Tokyo (JP)

( * ) Notice: Subject to any disclaimer, the term of this patent is extended or adjusted under 35 U.S.C. 154(b) by 381 days.

(21) Appl. No.: 10/680,357

(22) Filed: Oct. 8, 2003

(65) Prior Publication Data

US 2004/0078518 A1 Apr. 22, 2004

(30) Foreign Application Priority Data

Oct. 17, 2002 (JP) ............................. 2002-303504

(51) Int. Cl.
*G06F 12/08* (2006.01)
(52) U.S. Cl. ..................... 711/113; 711/114; 711/129; 711/136; 711/209
(58) Field of Classification Search .................... None
See application file for complete search history.

(56) References Cited

U.S. PATENT DOCUMENTS 5,717,893 A * 2/1998 Mattson ...................... 711/129
6,341,331 B1 * 1/2002 McNutt ...................... 711/113

FOREIGN PATENT DOCUMENTS

| JP | 58-144961 | 8/1983 |
|---|---|---|
| JP | 62-233864 | 10/1987 |
| JP | 2-36446 | 2/1990 |
| JP | 5-128002 | 5/1993 |
| JP | 6-89232 | 3/1994 |
| JP | 7-319771 | 12/1995 |
| JP | 8-115263 | 5/1996 |
| JP | 8-314779 | 11/1996 |
| JP | 10-333984 | 12/1998 |
| JP | 2000-353126 | 12/2000 |
| JP | 2001-142778 | 5/2001 |

* cited by examiner

*Primary Examiner*—Gary Portka
(74) *Attorney, Agent, or Firm*—Young & Thompson

(57) ABSTRACT

It is desired that the cache hit rate of access from a host (or an application) not be affected by an access pattern of another host (or an application). To achieve this, segment information setting means sets information in a segment information management table based on a setting command from a host (11) or a host (12). Input/output management means identifies to which access group an input/output request from the host (11) or (12) corresponds based on the setting in the segment information management table and the link status of the LRU links corresponding to the cache segments managed in a cache management table and, considering the division sizes allocated to the cache segments, controls discarding data from the cache memory for each cache segment.

17 Claims, 15 Drawing Sheets

FIG. 3A

SEGMENT INFORMATION MANAGEMENT TABLE (62)

| SEGMENT MANAGEMENT TABLE | ALLOCATION CRITERION VALUE |
|---|---|
| CACHE SEGMENT #0 | 100 |
| CACHE SEGMENT #1 | 0 |
| CACHE SEGMENT #2 | 0 |
| CACHE SEGMENT #3 | 0 |

| PORT MANAGEMENT TABLE | CACHE SEGMENT NUMBER |
|---|---|
| PORT #0 | #0 |
| PORT #1 | #0 |
| PORT #2 | #0 |
| PORT #3 | #0 |

FIG. 3B

SEGMENT INFORMATION MANAGEMENT TABLE (62)

| SEGMENT MANAGEMENT TABLE | ALLOCATION CRITERION VALUE |
|---|---|
| CACHE SEGMENT #0 | 70 |
| CACHE SEGMENT #1 | 30 |
| CACHE SEGMENT #2 | 0 |
| CACHE SEGMENT #3 | 0 |

| PORT MANAGEMENT TABLE | CACHE SEGMENT NUMBER |
|---|---|
| PORT #0 | #0 |
| PORT #1 | #0 |
| PORT #2 | #1 |
| PORT #3 | #1 |

SEGMENT INFORMATION MANAGEMENT TABLE

| SEGMENT MANAGEMENT TABLE | ALLOCATION CRITERION VALUE |
|---|---|
| CACHE SEGMENT #0 | 70 |
| CACHE SEGMENT #1 | 30 |
| CACHE SEGMENT #2 | 0 |
| CACHE SEGMENT #3 | 0 |

| LOGICAL DISK MANAGEMENT TABLE | CACHE SEGMENT NUMBER |
|---|---|
| LOGICAL DISK #0 | #0 |
| LOGICAL DISK #1 | #0 |
| LOGICAL DISK #2 | #1 |
| LOGICAL DISK #3 | #1 |

SEGMENT INFORMATION MANAGEMENT TABLE

| SEGMENT MANAGEMENT TABLE | MAXIMUM USAGE AMOUNT | MINIMUM USAGE AMOUNT | PRIORITY |
|---|---|---|---|
| CACHE SEGMENT #0 | 70 | 10 | 1 |
| CACHE SEGMENT #1 | 30 | 0 | 2 |
| CACHE SEGMENT #2 | 30 | 5 | 3 |
| CACHE SEGMENT #3 | 0 | 0 | 0 |

| PORT MANAGEMENT TABLE | CACHE SEGMENT NUMBER |
|---|---|
| PORT #0 | #0 |
| PORT #1 | #1 |
| PORT #2 | #2 |

| SEGMENT INTERNAL MANAGEMENT TABLE 63 | ALLOCATION CRITERION VALUE | ACCESS COUNT | ACCESS LEVEL |
|---|---|---|---|
| CACHE SEGMENT #0 | 54 | 0 | 0 |
| CACHE SEGMENT #1 | 23 | 0 | 0 |
| CACHE SEGMENT #2 | 23 | 0 | 0 |
| CACHE SEGMENT #3 | 0 | 0 | 0 |

FIG. 11A

| SEGMENT INTERNAL MANAGEMENT TABLE 63 | ALLOCATION CRITERION VALUE | ACCESS COUNT | ACCESS LEVEL |
|---|---|---|---|
| CACHE SEGMENT #0 | 70 | 100 | 2 |
| CACHE SEGMENT #1 | 20 | 10 | 1 |
| CACHE SEGMENT #2 | 10 | 10 | 1 |
| CACHE SEGMENT #3 | 0 | 0 | 0 |

FIG. 11B

| SEGMENT INTERNAL MANAGEMENT TABLE 63 | ALLOCATION CRITERION VALUE | ACCESS COUNT | ACCESS LEVEL |
|---|---|---|---|
| CACHE SEGMENT #0 | 40 | 0 | 0 |
| CACHE SEGMENT #1 | 30 | 10 | 1 |
| CACHE SEGMENT #2 | 30 | 10 | 1 |
| CACHE SEGMENT #3 | 0 | 0 | 0 |

FIG. 11C

DISK ARRAY DEVICE MANAGING CACHE MEMORY BY DIVIDING CACHE MEMORY INTO A PLURALITY OF CACHE SEGMENTS

BACKGROUND OF THE INVENTION

1. Field of the Invention

The present invention relates to a disk array device that manages cache memory, which is accessed by host computers (hereinafter called "host"), by dividing the cache memory into a plurality of cache segments.

2. Description of the Related Art

In some systems (computer systems), a plurality of hosts are connected to one disk array device for sharing storage.

In such a system, the disk array device has a plurality of ports to which a plurality of hosts are usually connected, one for each. A plurality of hosts may also be connected to the same port.

Although data on the storage can be shared in such a system, data may not only be shared but also be built as data dedicated to each host.

Such a system is not only required to provide good performance when a plurality of hosts access the system separately but also expected not to extremely delay responses even when a plurality of hosts access the system at the same time. A plurality of hosts, if connected to one disk array device, results in a hardware resource conflict in the disk array device. This requires the disk array device to appropriately distribute the hardware resources in the device.

One of the important performance factors in a disk array device is cache memory. Although data in a disk array device is all stored on disks, frequently-accessed data is copied to the cache memory. Because data is read from the cache memory much more speedily than data is read from a disk, the average performance of a disk array device depends largely on the cache hit rate.

The LRU (Least Recently Used) control method is a general, efficient cache algorithm for providing a high cache hit rate.

This control method is such that all data in the cache memory is sequentially linked and accessed data is reconnected to the top of the link and, when a cache miss occurs, the data at the end of the link is discarded. According to this control method, if once-accessed data is accessed again immediately after the last access, a cache hit occurs but, if accessed data is not accessed for some time, the data is discarded. Therefore, the more frequently specific data is accessed, the higher the hit rate becomes.

As prior-art technologies, Japanese Patent Laid-Open Publication No. 2001-142778 (pages 6-7, FIG. 1) and Japanese Patent Laid-Open Publication No. 1995-319771 (page 4, FIG. 1) disclose technologies for dividing cache memory into a plurality of segments. However, those prior-art technologies do not disclose the concept of "access group" that will be described nor do they disclose a method for determining cache memory division units used in a disk array device.

When the cache algorithm according to the prior-art LRU control method described above is used, a cache hit cannot be expected to occur if access is made randomly across a range that is larger in relation to the cache size. Although this condition is unavoidable, the problem is that data that has been stored in the cache memory up to that moment is discarded. That is, if an access pattern that is not expected to cause a cache hit and another access pattern that is expected to cause a cache hit are mixed, the access pattern that is expected to cause a cache hit is also affected with the result that the cache hit rate decreases as compared with that when access patterns are not mixed.

This condition is a problem especially in a multi-host environment described at the start of this specification; that is, an environment in which one host makes access to a specific, small area while another host makes access across a wide range. In such a case, although a high cache hit rate is normally expected for the host that makes access to a small area, the cache hit rate is decreased because it is affected by the host that makes access across a wide range.

In particular, when access requests issued from the host that makes access across a wide range discard the cache data while the host that makes access to a small area does not issue access requests, an I/O (Input/Output) request issued from the host that accesses a small area result in a cache miss in most cases.

When this condition is generated, the performance of an application in one host that is expected to cause a cache hit is decreased by the operation of another host and it becomes difficult to estimate the performance of the system. Therefore, a need arises for a method of controlling performance that is less affected by accesses from another host.

A straightforward example is a system where a host that executes backup processing and a host that does not execute business operations but evaluates development performance coexist. A large amount of data is moved during backup processing and normally a cache hit is not expected, and it is desirable that the host that evaluates development performance be expected not to affect the performance of the host that executes business operations. The present invention was made with such an environment in mind.

SUMMARY OF THE INVENTION

In view of the foregoing, it is an object of the present invention to provide a cache memory division management system for use in a disk array device that controls access from a plurality of hosts by dividing the cache to allow a separate cache memory division area (cache segment) to be used by each access group (the contents of an access group will be described later). This can prevent the cache hit rate of access from one host (or application) from being affected by an access pattern of another host (or another application) even when one disk array device is accessed by a plurality of hosts (or accessed by a plurality of applications on one host).

The present invention provides a disk array device having cache memory and accessed by hosts, wherein cache segment identifiers and access groups are defined for managing the cache memory by dividing it into a plurality of cache segments, each corresponding to an access group, the disk array device comprising:

a segment information management table comprising a segment management table that manages, for each cache segment identifier, a division size criterion value for the cache segment; and an access group management table that manages information on a correspondence between the access groups and the cache segments;

a cache management table managing information on a link status of LRU (Least Recently Used) links provided one for each cache segment for controlling data discarding from the cache memory;

segment information setting means that sets information in the segment information management table based on a setting command from a host; and input/output management means that, based on settings in the segment information management table and the link status of LRU links corresponding to the cache segments managed in the cache management table, identifies to which access group an input/output request from a host corresponds and that, considering a division size allocated to each cache segment, controls discarding data from the cache memory of each cache segment.

A disk array device according to the present invention may be the disk array device wherein the segment management table in the segment information management table contains allocation criterion values, each of which indicates in percentage a fixed usage amount allocated to each cache segment, as division size criterion values, and wherein the access group management table in the segment information management table contains information on a correspondence between access group identification information and cache segment numbers and wherein the input/output management means determines an access group corresponding to an input/output command from a host, references the access group management table to identify a cache segment allocated to the access group, references the segment management table to identify the allocation criterion value of each cache segment, references the cache management table to determine a data allocation amount of each cache segment at this moment, determines a cache segment from which data is to be discarded based on the determination and the identification, and controls discarding data from, and storing data into, the cache memory.

A disk array device in another mode of the present invention is a disk array device having cache memory and accessed by hosts, wherein cache segment identifiers and access groups are defined for managing the cache memory by dividing it into a plurality of cache segments, each corresponding to an access group, the disk array device comprising:

a segment information management table comprising a segment management table that manages, for each cache segment identifier, variable division size criterion values for the cache segment; and an access group management table that manages information on a correspondence between the access groups and the cache segments;

a cache management table managing information on a link status of LRU links provided one for each cache segment for controlling data discarding from the cache memory;

a segment internal management table that manages frequencies of access to the cache segments for controlling a dynamic change in division sizes based on an access pattern of a host and maintains information on the division sizes currently allocated to the cache segments;

segment information setting means that sets information in the segment information management table based on a setting command from a host;

input/output management means that, based on settings in the segment information management table, the link status of LRU links corresponding to the cache segments managed in the cache management table, and information on current division sizes stored in the segment internal management table, identifies to which access group an input/output request from a host corresponds and that, considering a division size allocated to each cache segment, controls discarding data from the cache memory of each cache segment; and allocation criterion value determination means that determines a division size to be allocated to each cache segment based on the access frequencies managed in the segment internal management table and the variable division size criterion values stored in the segment management table.

A disk array device according to the present invention may be the disk array device wherein the segment management table in the segment information management table contains maximum usage amounts and minimum usage amounts, which indicate variable usage amounts, and priorities for the cache segments as variable division size criterion values, wherein the access group management table in the segment information management table contains information on a correspondence between access group identification information and cache segment numbers and the segment internal management table contains access counts and access levels, which are information on managing access frequencies, and allocation criterion values which indicate current division sizes, wherein the input/output management means determines an access group corresponding to an input/output command from a host, references the access group management table to identify a cache segment allocated to the access group, references the segment internal management table to identify current allocation criterion values of the cache segments, references the cache management table to determine a data allocation amount of each cache segment at this moment, determines a cache segment from which data is to be discarded based on the determination and the identification, and controls discarding data from, and storing data into, the cache memory, and wherein the allocation criterion value determination means references the segment management table and the segment internal management table to determine a cache segment allocation criterion value of a cache segment at each access level within a range of the maximum usage amount and the minimum usage amount in descending order of access levels and, for a distribution of allocation criterion value between cache segments at an equal access level, takes into consideration the priorities of the cache segment.

A disk array device according to the present invention may be the disk array device wherein a setting change in the information in the segment information management table can be made dynamically by a setting command from a host and wherein the division size of each cache segment can be changed dynamically by changing the link status of LRU links of the cache segments managed in the cache management table while reflecting the setting change during input/output processing that is executed after the setting change.

A disk array device according to the present invention may be the disk array device wherein a setting change in the information in the segment information management table can be made dynamically by a setting command from a host and wherein the division size of each cache segment can be changed dynamically by changing the link status of LRU links of the cache segments managed in the cache management table while reflecting the setting change during input/output processing that is executed after the setting change.

A disk array device according to the present invention may be the disk array device wherein the access group is allocated according to a port via which a command is received and a port management table is used as the access group management table.

A disk array device according to the present invention may be the disk array device wherein the access group is allocated according to a port via which a command is received and a port management table is used as the access group management table.

A disk array device according to the present invention may be the disk array device wherein the access group is allocated according to a logical disk number specified by a command and a logical disk management table is used as the access group management table.

A disk array device according to the present invention may be the disk array device wherein the access group is allocated according to a logical disk number specified by a command and a logical disk management table is used as the access group management table.

A disk array device according to the present invention may be the disk array device wherein the access group is allocated according to a host ID of a host from which a command is issued and a host management table is used as the access group management table.

A disk array device according to the present invention may be the disk array device wherein the access group is allocated according to a host ID of a host from which a command is issued and a host management table is used as the access group management table.

The present invention provides a method of managing cache memory of a disk array device, which is accessed by hosts, by dividing the cache memory, comprising the steps of:

A. defining cache segment identifiers and access groups to manage the cache memory by dividing it into a plurality of cache segments each corresponding to an access group, the access group being a group set up by a condition that can be determined by information included in a command specifying input/output;

B. receiving, by a controller in the disk array device, a command specifying input/output from the host;

C. determining which access group corresponds to the command;

D. identifying a cache segment allocated to the access group;

E. referencing a segment management table to identify allocation criterion values of the cache segments;

F. determining current data allocation sizes of the cache segments;

G. based on the determination and the identification in steps C, D, E, and F, determining a cache segment from which data is to be discarded; and H. based on the determination, discarding data from, or storing data into, the cache memory.

The present invention provides a method of managing cache memory by dividing the cache memory, wherein, in step F, a determination is made how much data is connected to each cache segment LRU link, wherein, in step G, a determination is made that, if the allocation criterion value of the cache segment is not exceeded even when new data is stored in the cache segment without discarding data, data is not discarded from the cache segment and, if the allocation criterion value of the cache segment is exceeded when new data is stored in the cache segment without discarding data, data is discarded from the cache segment if data discarding is required.

The present invention provides a program embodied in electrical signals, the program enabling a controller to execute each step A to H.

The present invention provides a program embodied in a computer readable medium, the program enabling a controller to execute each step A to H.

The present invention provides a method of managing cache memory of a disk array device, which has cache memory and is accessed by hosts, by dividing the cache memory, comprising the steps of:

A. defining cache segment identifiers and access groups to manage the cache memory by dividing it into a plurality of cache segments each corresponding to an access group, the access group being a group set up according to a condition that can be determined by information included in a command specifying input/output;

B. receiving, by a controller in the disk array device, a command specifying input/output from the host;

C. determining which access group corresponds to the command;

D. identifying a cache segment allocated to the access group;

E. storing information into a segment internal management table to perform dynamic change control of division sizes based on an access pattern from the host, the information managing frequencies of access to the cache segments and indicating division sizes currently allocated to cache segments;

F. determining values indicating division sizes to be allocated to the cache segments based on the access frequencies managed in the segment internal management table and on variable division size criterion values in a segment management table that manages, for each cache segment identifier, variable division size criterion values for the cache segment; and G. identifying to which access group the input/output request from the host corresponds, based on setting contents in the segment management table, a link status of LRU links each corresponding to a cache segment managed in the cache management table, and the information indicating the current division sizes in the segment internal management table and, while taking into consideration the division sizes allocated to the cache segments, controlling discarding data from the cache memory for each cache segment.

The present invention provides a program embodied in electrical signals, the program enabling a controller to execute each step A to G.

The present invention provides a program embodied in a computer readable medium, the program enabling a controller to execute each step A to G.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying, wherein:

FIGS. 3A and 3B are diagrams showing the actual operation of the cache memory division management system in the disk array device shown in FIG. 1;

FIG. 7 is a diagram showing the actual operation of the cache memory division management system in the disk array device shown in FIG. 6;

FIG. 10 is a diagram showing the actual operation of the cache memory division management system in the disk array device shown in FIG. 9;

FIGS. 11A-11C are diagrams showing the actual operation of the cache memory division management system in the disk array device shown in FIG. 9;

DESCRIPTION OF THE PREFERRED EMBODIMENTS

Next, the present invention will be described in detail by referring to the attached drawings.

(1) First Embodiment

Figure 1:
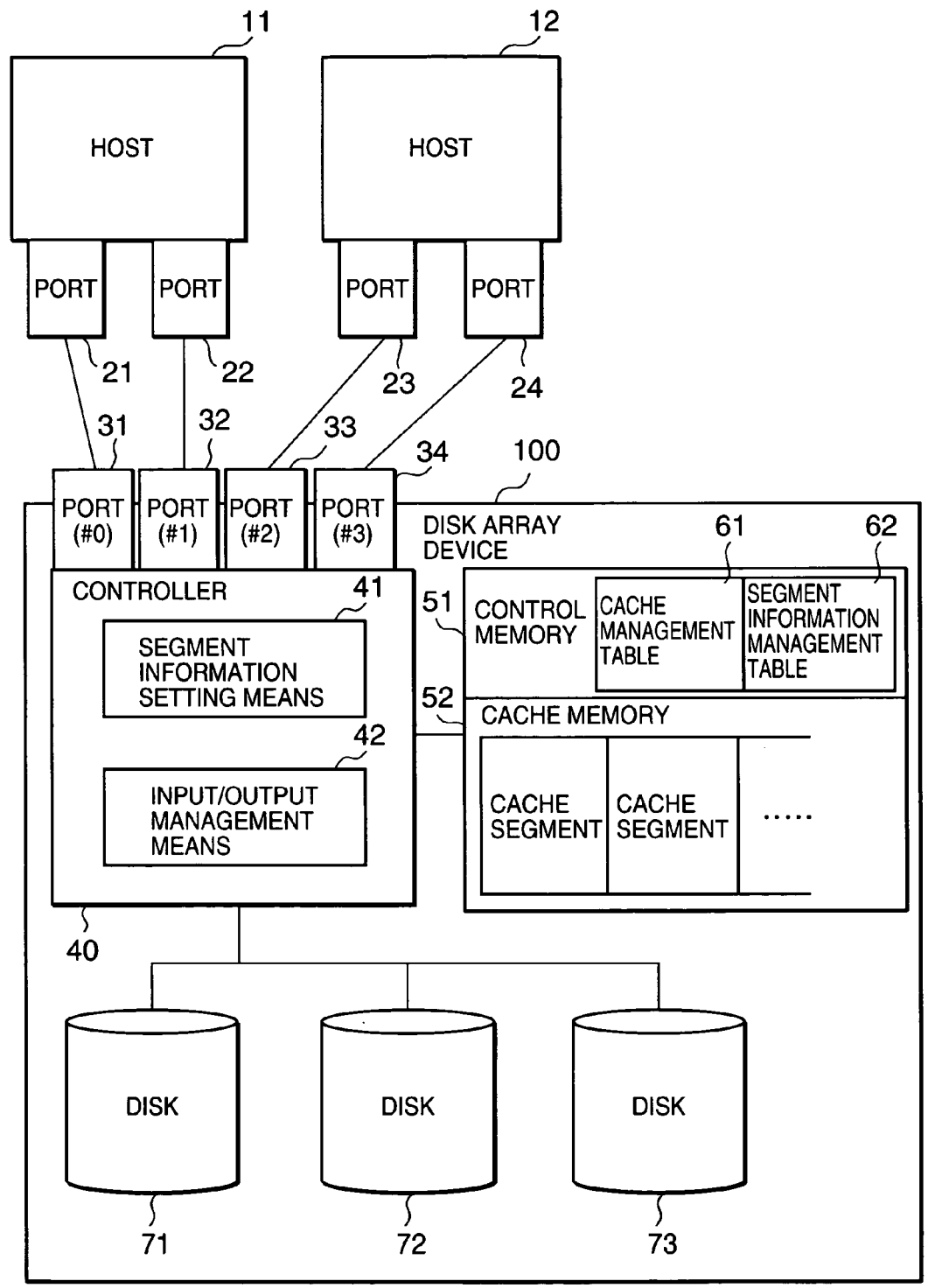
FIG. 1 is a block diagram showing the configuration of a cache memory division management system for use in a disk array device in a first embodiment of the present invention.

FIG. 1 is a block diagram showing the configuration of a cache memory division management system for use in a disk array device in a first embodiment according to the present invention.

Referring to FIG. 1, the cache memory division management system for use in the disk array device in this embodiment comprises a plurality of hosts (host 11 and 12) and a disk array device 100.

The disk array device 100 has a plurality of ports 31-34. The port 31 and the port 32 are connected to a port 21 and a port 22 of the host 11, and the port 33 and the port 34 are connected to a port 23 and a port 24 of the host 12. In this way, the disk array device 100 is connected to the two hosts 11 and 12, each via two ports. The disk array device 100 is connected to the two ports of each host to provide against possible path errors.

The disk array device 100 also comprises a controller 40, control memory 51, cache memory 52, and disks 71-73.

The controller 40 controls reading data from, and writing data to, the disks 71-73 and the cache memory 52 according to commands received from the host 11 and the host 12.

The controller 40 comprises segment information setting means 41 and input/output management means 42.

The control memory 51 is memory used by the controller 40 to execute the control operation described above. In this embodiment, the control memory 51 has a cache management table 61 (LRU control table) for performing normal cache management operations and a segment information management table 62 for controlling and managing cache segment information.

As shown in FIG. 3, the segment information management table 62 is composed of a segment management table and a port management table.

The segment management table manages information indicating division size criterion values for the cache segments. Here, the "division size criterion value" refers to an index indicating how much of the total size of the cache memory 52 each cache segment is allocated. Most straightforwardly, a value indicating a division percentage directly as the "allocation criterion value" corresponds to the division size criterion value as in this embodiment. The disk array device 100 performs operation according to the specified division size criterion values to manage cache segment amounts.

In this embodiment, #0-#3 are defined as cache segment identifiers (cache segment numbers) and the segment management table stores and manages allocation criterion values, represented in percentage, for cache segments #0-#3. For example, in FIG. 3A, the allocation criterion value for cache segment #0 is 100% and the allocation criterion values for other cache segments are 0%.

The port management table corresponds to an access group management table that manages access group allocation.

An "access group" refers to a group that is set up based on conditions that can be determined by information included in an I/O command received by the disk array device 100 from one of the hosts.

An example of conditions for determining an access group includes information such as a port (its port number) via which the command was received, a logical disk number specified by the command, the host ID of the host that issued the command. Because this information is all included in the received command, the disk array device 100 can determine a cache segment corresponding to the command by referring to the setting values that are held.

In this embodiment, the access groups are set up according to a port via which a command is received. Therefore, the port management table is used as the access group management table.

The port management table stores and manages information on a cache segment to be used by a command received via each of ports 31-34 (ports with the port numbers of #0-#3). For example, in FIG. 3A, all ports are allocated to cache segment #0 (cache segment with the cache segment number of #0). That is, FIG. 3A indicates status in which the cache memory 52 is not virtually divided.

Figure 4A:
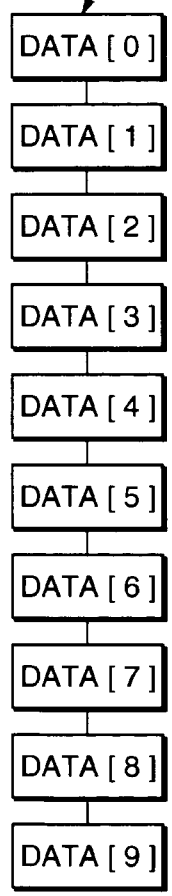
FIGS. 4A-4C are diagrams showing the actual operation of the cache memory division management system in the disk array device shown in FIG. 1.

The cache management table 61 manages information on the contents of LRU links (see FIG. 4) each corresponding to a cache segment in the cache memory 52. In FIG. 4A, data [0]-[9] in the cache memory 52 is all managed as data connected to the cache segment #0 LRU link.

Figure 2:
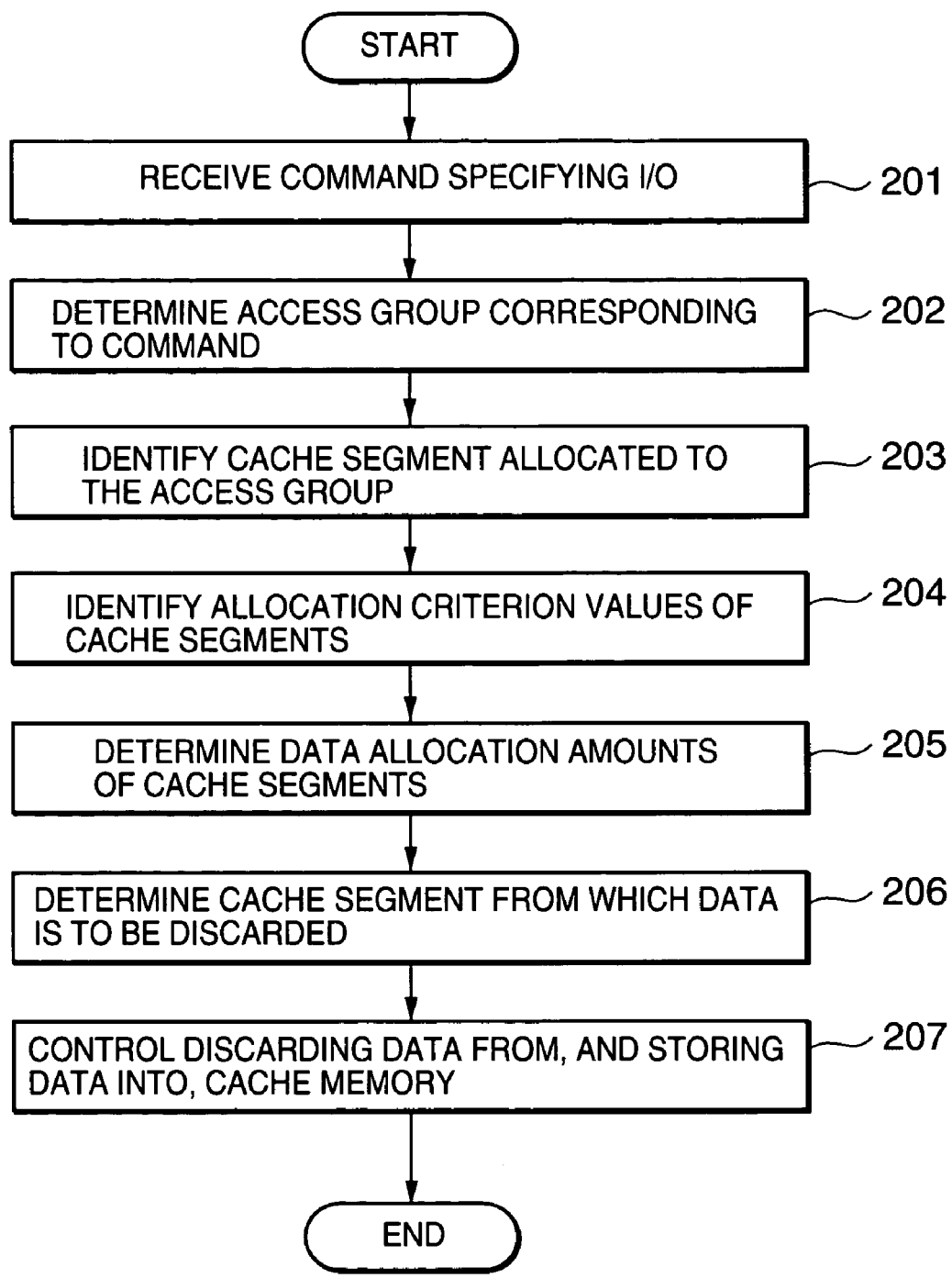
FIG. 2 is a flowchart showing the input/output management processing of the cache memory division management system in the disk array device shown in FIG. 1.

FIG. 2 is a flowchart showing the input/output management processing (processing executed by input/output management means 42) of the cache memory division management system in the disk array device in this embodiment.

The processing comprises a step 201 of receiving an I/O specification command, a step 202 of determining an access group, a step 203 of identifying a cache segment, a step 204 of identifying an allocation criterion value, a step 205 of determining a data allocation amount, a step 206 of determining a cache segment whose data is to be discarded, and a step 207 of controlling discarding and storage.

FIGS. 3-5 are diagrams showing in detail the operation of the cache memory division management system for use in the disk array device in this embodiment.

That is, as described above, FIG. 3 is a diagram showing how the contents of the segment information management table 62 change during the actual operation in this embodiment.

As partially mentioned above, FIGS. 4-5 are diagrams showing how the contents of the cache management table 61 change during the actual operation in this embodiment.

Next, with reference to FIGS. 1-5, the whole operation of the cache memory division management system in the disk array device in this embodiment, which is configured as described above, will be described in detail.

First, the operation (operation of segment information setting means 41) executed when cache segment information is set will be described.

FIG. 3A is a diagram showing the status of the segment information management table 62 before cache segment information setting processing described below is executed (that is, before the setting is changed).

Assume that the setting in this table is changed to the setting shown in FIG. 3B by a setting command (a command specifying the setting of cache segment information) received from the host 11 or host 12.

That is, in response to the setting command, the segment information setting means 41 in the controller 40 in the disk array device 100 changes the setting of the cache segment information in the segment information management table 62 (port management table and segment management table).

According to this setting, the port 31 with the port number of #0 and the port 32 with the port number of #1 are related to cache segment #0, and the port 33 with the port number of #2 and the port 34 with the port number of #3 are related to cache segment #1, in the port management table. That is, this setting indicates that there is a one-to-one relation between the host 11 and cache segment #0 and a one-to-one relation between the host 12 and cache segment #1.

In addition, in the segment information management table, the allocation criterion value of cache segment #0 is set to 70%, and the allocation criterion value of cache segment #1 is set to 30%. This means that the host 11 uses 70% of the cache size and that the host 12 uses 30% of the cache size.

Second, the operation executed during input/output management processing in the disk array device 100 (operation of input/output management means 42) after the segment information management table is set up as shown in FIG. 3B will be described (see FIG. 2).

After the setting of the segment information management table 62 is changed from the status shown in FIG. 3A to the status shown in FIG. 3B (dynamic setting change), the I/O management means 42 in the controller 40 executes the processing shown below (see FIG. 2).

First, in response to an input/output command (step 201), the I/O management means 42 determines the access group corresponding to the command (step 202). That is, the I/O management means 42 determines from which port (that is, from which host) the command was received.

After that, the I/O management means 42 references the port management table in the segment information management table 62 to identify the cache segment (cache segment number) allocated to the access group (step 203).

The I/O management means 42 references the segment management table in the segment information management table 62 to identify the allocation criterion value of each cache segment (step 204).

In addition, the I/O management means 42 references the cache management table 61 to determine the data allocation amount of each cache segment at this point (how much data is connected to each cache segment LRU link) (step 205).

Then, based on the determined and identified contents in steps 202 to 205 described above, the I/O management means 42 determines a cache segment from which data is to be discarded (step 206) and, based on that determination, controls the discarding and storage of data in the cache memory 52 (step 207).

For example, when the LRU link status is as shown in FIGS. 4 and 5, the processing described below is performed.

FIG. 4A is a diagram showing the status of the LRU link of the cache memory 52 at the moment the segment information management table is set as shown in FIG. 3B (The contents of the cache management table 61 indicate this LRU link status). At this moment, all data (data [0]-[9]) in the cache memory 52 is still connected to the cache segment #0 LRU link (All data is allocated to cache segment #0).

Figure 4B:
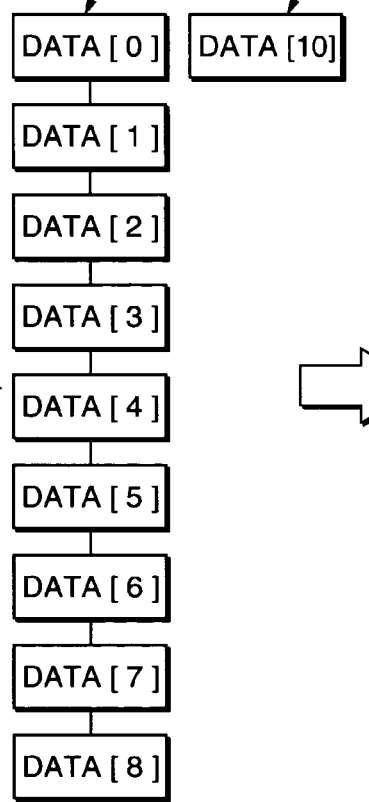

At this point, when the disk array device 100 receives from the host 12 a command that specifies the input/output of data [10] via the port 33 or the port 34 (corresponding to cache segment #1), the LRU link status is changed to the one shown in FIG. 4B.

That is, data [9] is discarded from the cache memory 52 because the command received from the host 12 requests the input/output of data [10]. The cache segment #0 LRU link contains data [0]-[8], and the cache segment #1 LRU link containing only data [10] is created.

Figure 4C:
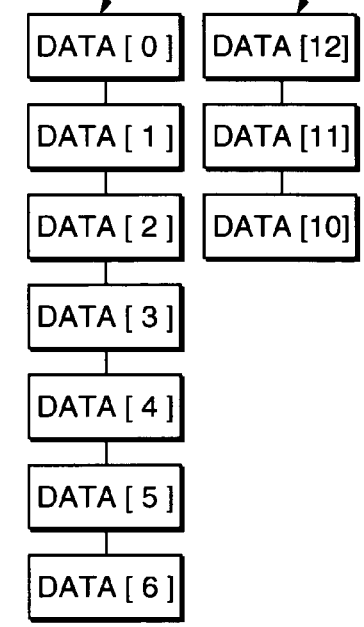

Then, the input/output of data [11] and data [12] is requested from the host 12 via the port 33 or port 34. After that, the status of the LRU links is as shown in FIG. 4C.

Again, in this case, the same operation as that described above is executed. Data [7] and data [8] are discarded from the cache segment #0 LRU link, and data [11] and data [12] are connected to the cache segment #1 LRU link.

At this time, the percentage of data allocation between the cache segment #0 LRU link and cache segment #1 LRU link is divided into 70% and 30% as set in the segment management table shown in FIG. 3B.

Figure 5A:
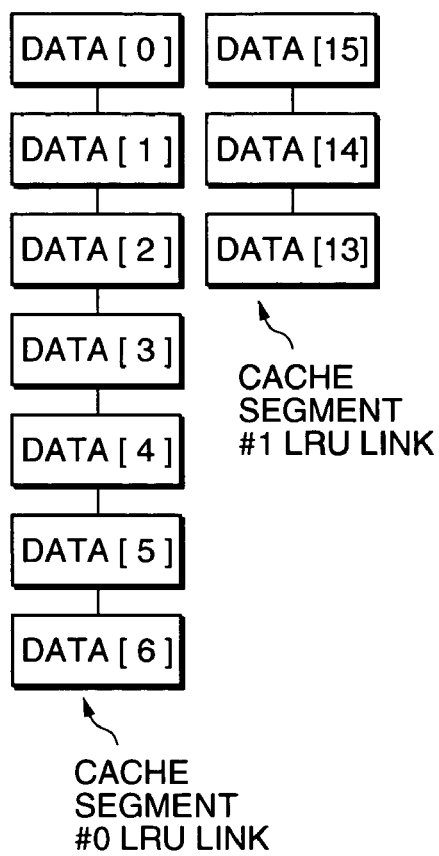
FIGS. 5A-5B are diagrams showing the actual operation of the cache memory division management system in the disk array device shown in FIG. 1.

FIG. 5A is a diagram showing the status of the LRU links when the host 12 issues another input/output request for data [13]-[15].

In this case, an operation different from that described above is executed. That is, because the cache segment #1 LRU link already contains 30% of data, the cache segment #1 LRU link is processed under LRU control without affecting the cache segment #0 LRU link.

Figure 5B:
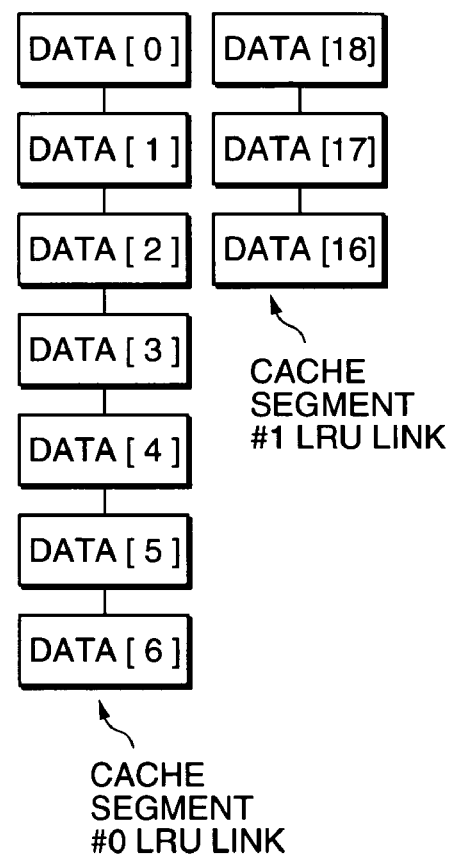

In addition, when the host 12 issues another input/output request for data [16]-[18], only the cache segment #1 LRU link is also processed to discard data as shown in FIG. 5B.

Although the host 12 has issued new data input/output requests one after another before the status becomes the one shown in FIG. 5B, 70% of data, [0]-[6], stored in the total cache is protected in cache segment #0 as shown in FIG. 5B. Therefore, the next time the host 11 accesses the data, a cache hit will occur.

(2) Modification of First Embodiment

A modification of the first embodiment described above is possible.

As described above, other than a port via which a command is received, a logical disk number specified by a command or the host ID of a host from which a command is issued is also an example of conditions for setting up access groups.

Therefore, instead of the port management table in the first embodiment, a logical disk management table (table indicating the correspondence between logical disks and cache segments) or a host management table (table indicating the correspondence between hosts and cache segments) may be used as the access group management table.

Although it is assumed in the first embodiment that a plurality of hosts access the disk array device 100, it is also possible and significant that the present invention is applied to a system including only one host that contains a plurality of applications.

Figure 6:
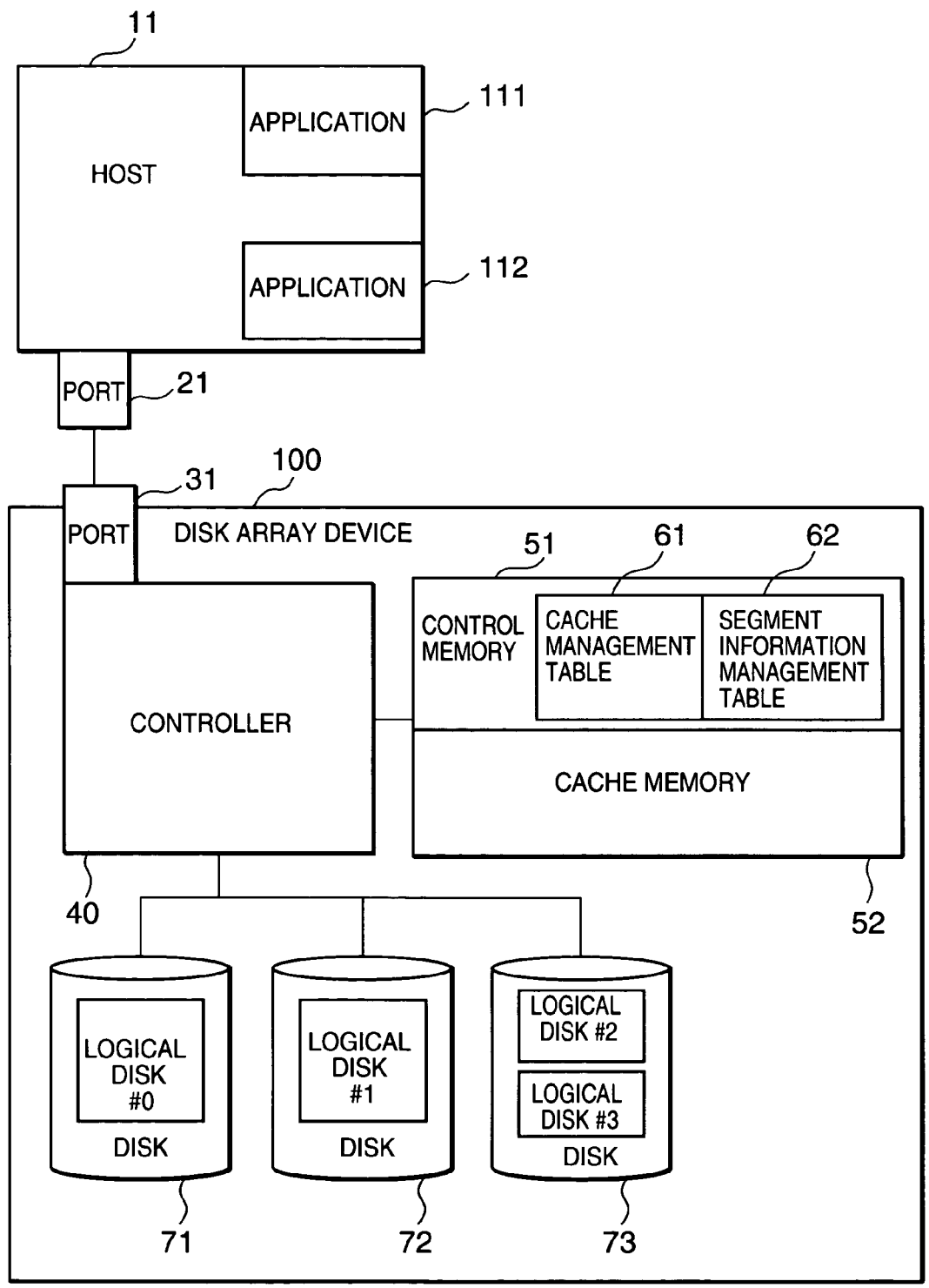
FIG. 6 is a block diagram showing the configuration of one example of a modification of the cache memory division management system in the first embodiment of the present invention.

FIG. 6 is a block diagram showing the actual configuration of a cache memory division management system in the modification of the first embodiment based on the concept described above.

FIG. 7 is a diagram showing the actual operation of this modification.

Referring to FIG. 6, a disk array device 100 is connected only to a host 11 via one port 31 in this cache memory division management system in the disk array device. However, a plurality of applications (application 111 and application 112) run on the host 11 and the applications access separate logical disks.

In such a case, the absolutely the same problem as that in the first embodiment described above is generated for cache memory 52.

Control memory 51 has a cache management table 61 (LRU control table) for performing normal cache management operations and a segment information management table 62 for controlling and managing cache segment information.

In this embodiment, the segment information management table 62 is composed of a segment management table and a logical disk management table corresponding to the access group management table as shown in FIG. 7.

As described above, the access group is defined in this modification according to a logical disk number specified by the received command. Therefore, the segment management table is exactly the same as that in the first embodiment, whereas, in the logical disk management table, a cache segment number is allocated to each of logical disks #0-#3 (logical disks with logical disk numbers of #0-#3).

Although there is only one host in a system to which the cache memory division management system in this disk array device is applied, the application of the present invention is meaningful because the host (host 11) has a plurality of applications running.

In this example, the application 111 accesses logical disk #0 and logical disk #1 and the application 112 accesses logical disk #2 and logical disk #3. The logical disk management table such as the one shown in FIG. 7 is set up.

Even when access groups are defined by logical disk numbers as shown in this example, the exactly the same cache division control function as that in the first embodiment may be implemented.

Similarly, even when access groups are defined by host IDs, the exactly the same cache division control function as that in the first embodiment may be implemented.

Figure 8:
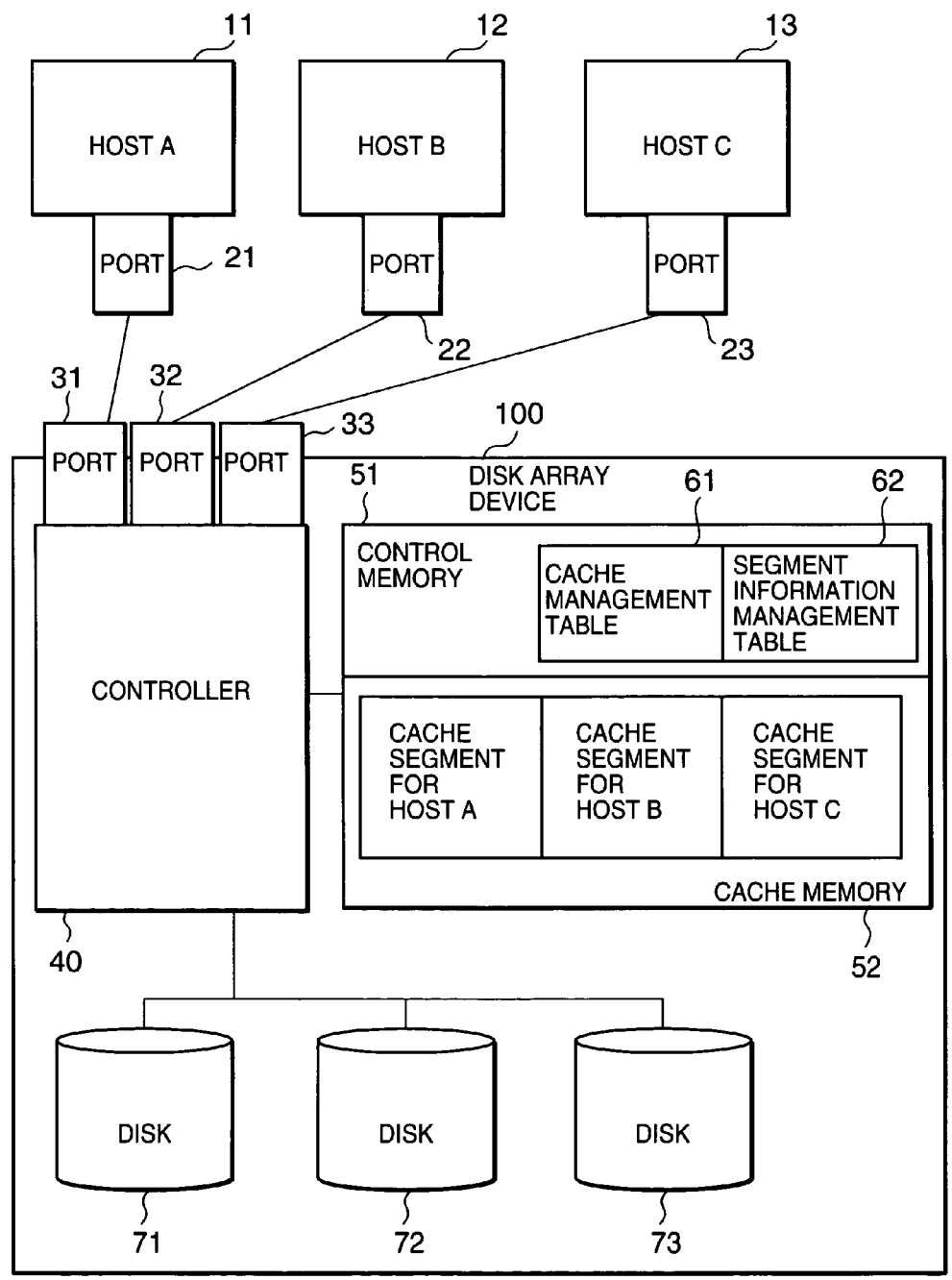
FIG. 8 is a block diagram showing the configuration of another example of a modification of the cache memory division management system in the first embodiment of the present invention.

FIG. 8 is a block diagram showing the configuration of an example of a cache memory division management system in a disk array device in such a case.

In this case, the segment information management table 62 is composed of a segment management table and a host management table corresponding to the access group management table. The cache memory 52 is divided into cache segments based on host IDs (host A, host B, and host C).

(2) Second Embodiment

Figure 9:
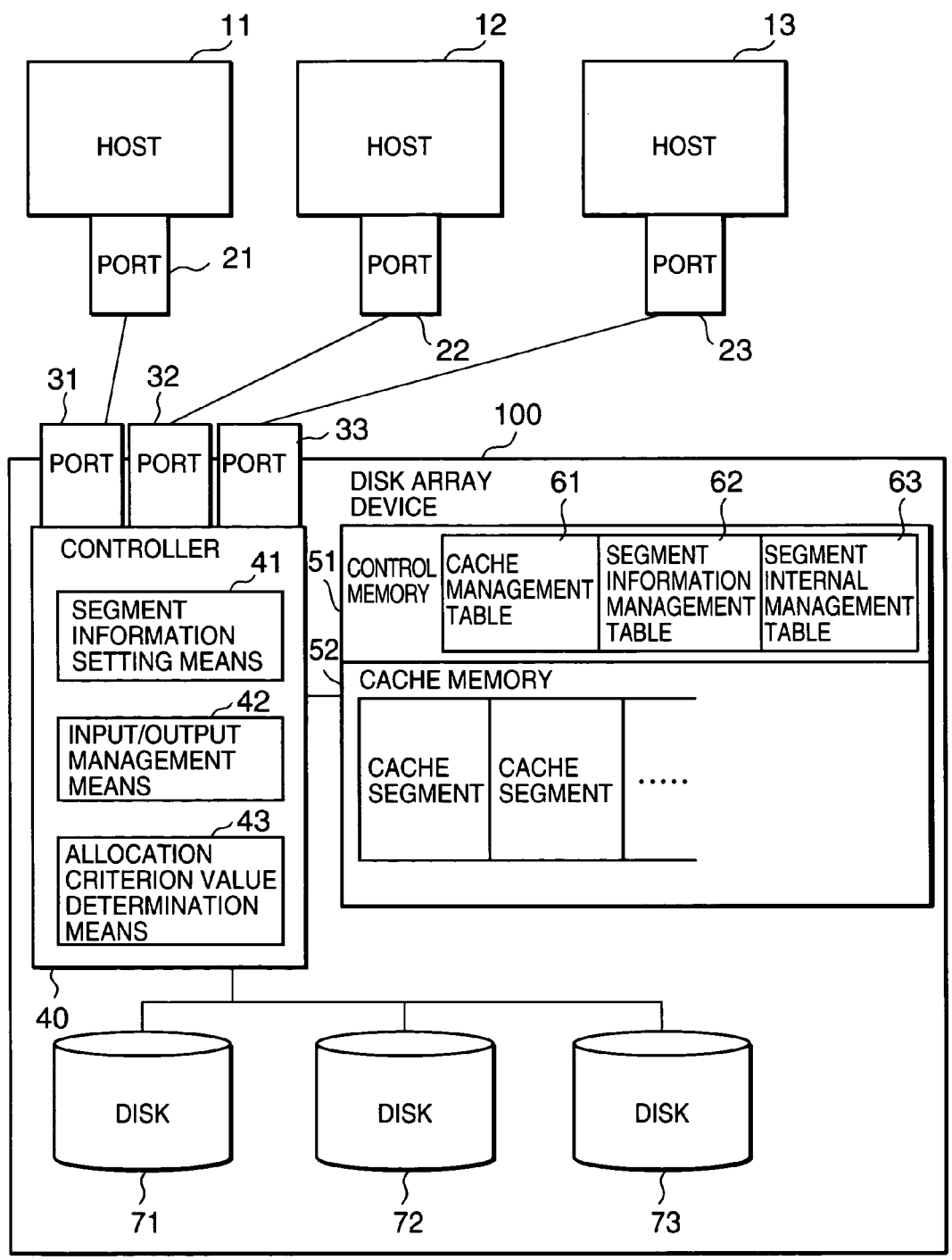
FIG. 9 is a block diagram showing the configuration of a cache memory division management system for use in a disk array device in a second embodiment of the present invention.

FIG. 9 is a block diagram showing the configuration of a cache memory division management system in a disk array device in a second embodiment of the present invention.

Referring to FIG. 9, the cache memory division management system in the disk array device in this embodiment comprises a plurality of hosts (host 11, host 12, and host 13) and a disk array device 100.

The disk array device 100 has a plurality of ports 31-33. The port 31 is connected to the port 21 of the host 11, the port 32 is connected to the port 22 of the host 12, and the port 33 is connected to the port 23 of the host 13 (The disk array device 100 is connected to three hosts, 11-13, via three ports 31-33).

The disk array device 100 comprises a controller 40, control memory 51, cache memory 52, and disks 71-73.

The controller 40 reads data from, and writes data to, the disks 71-73 and the cache memory 52 in response to a command from the hosts 11-13.

This controller 40 comprises segment information setting means 41, input/output management means 42, and allocation criterion value determination means 43.

In this embodiment, the control memory 51 comprises a cache management table 61 (LRU control table) for performing normal cache management operations, a segment information management table 62 for controlling and managing cache segment information, and a segment internal management table 63.

FIG. 10 is a diagram showing the actual contents of the segment information management table 62 in this embodiment.

As shown in FIG. 10, the segment information management table 62 is composed of a segment management table and a port management table corresponding to the access group management table. In this embodiment, access groups are defined by ports as in the first embodiment.

In this embodiment, the segment management table manages information on the maximum usage amount (maximum cache amount availability), minimum usage amount (minimum guaranteed amount) and priority of the cache segments (three criterion values, that is, the maximum usage amount, minimum usage amount, and priority, can be set for cache segments #0-#3).

In this way, in the cache memory division management system in the disk array device in this embodiment, the cache memory 52 is divided into variable percentages for each access group according to a plurality of division size criterion values (maximum usage amount, minimum usage amount, and priority) indicating the usage amounts of the cache memory 52 specified by the setting command. This system therefore allows the division percentages to be dynamically managed. As the division size criterion values for dividing the cache memory into variable percentages, the three types of information described above are not always required (for example, one of maximum usage amount and the minimum usage amount may be specified) or other information may be used.

In this embodiment, the cache segment division percentage is variable between the maximum value (maximum usage amount value) and the minimum value (minimum usage amount value) and is controlled by the specified priority. In this embodiment, not only the cache memory 52 is divided into fixed percentages but also the division percentages are dynamically changed to some degree according to the access status. This allows the cache memory 52 to be utilized.

Here, the dynamic change, mentioned by the expression "the division percentages are dynamically changed to some degree according to the access status", is made automatically; more specifically, the change is controlled based on the access pattern of the host. For example, the dynamic change is made frequently at a frequent-access time, and less frequently at a less-frequent access time. An access frequency management table for controlling the dynamic change is required. A segment internal management table 63, shown in FIG. 11, is the table used for this control.

FIG. 11 is a diagram showing an example of the segment internal management table 63 required for performing operation according to the setting in the segment management table in FIG. 10.

This segment internal management table 63 contains information on the allocation criterion value, access count, and access level for the cache segments.

The allocation criterion value is information indicating a percentage (percent) specifying a cache size to be actually allocated to each cache segment. Unlike the first embodiment (see FIG. 3), the value used in this embodiment is an internally managed dynamic value.

The access count is information indicating the number of times each cache segment was accessed for a predetermined time recently. To calculate this value, a counter, not shown, corresponding to each cache segment is provided. This counter is incremented by one each time LRU operation is performed and is cleared at an interval. The value of the counter immediately before it is cleared is written in the access count column of the segment internal management table 63. The next time a predetermined time elapses, the same processing is also performed to keep on updating the segment internal management table 63. The recent access status is managed in this way.

The access level is a value determined based on the value of the access count. In the example shown in FIG. 11, the access level is set to 2 when the access count is 100 or higher, the access level is set to 0 when the access count is 0, and the access level is set to 1 in other cases.

Figure 12:
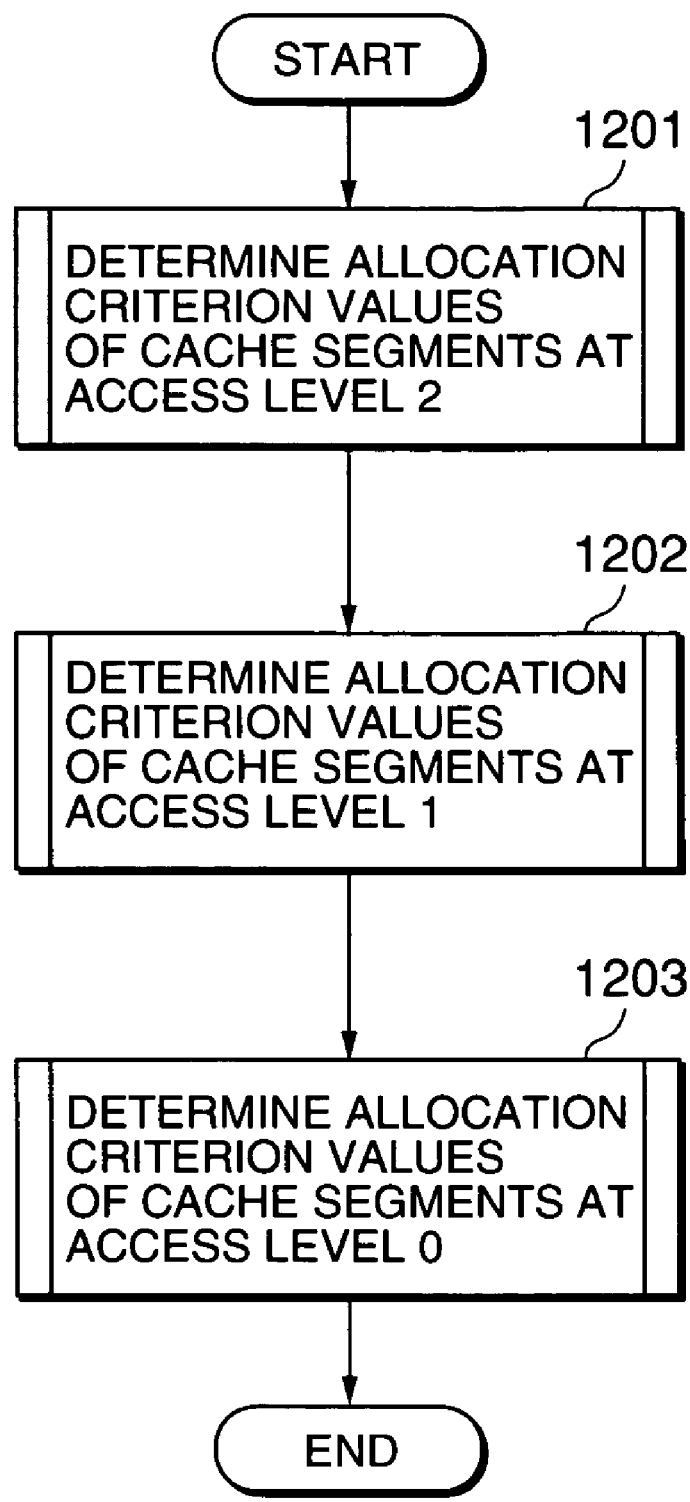
FIG. 12 is a flowchart showing the allocation criterion value determination processing in the cache memory division management system in the disk array device shown in FIG. 9.
Figure 13:
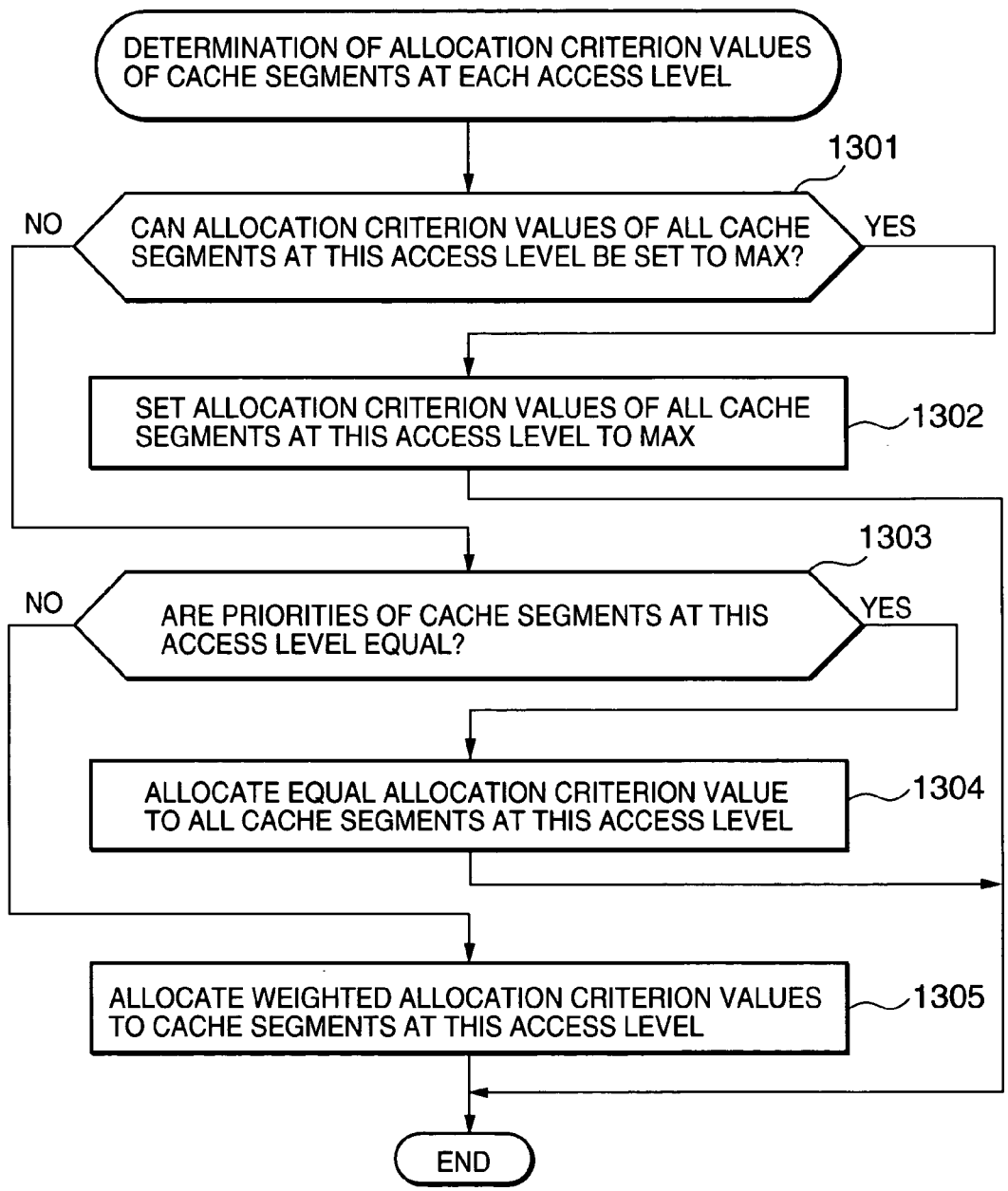
FIG. 13 is a flowchart showing the allocation criterion value determination processing in the cache memory division management system in the disk array device shown in FIG. 9.

FIG. 12 and FIG. 13 are flowcharts showing the allocation criterion value determination processing (processing executed by allocation criterion value determination means 43) in the cache memory division management system in the disk array device in this embodiment. This processing comprises a step 1201 of determining the access level 2 allocation criterion value, a step 1202 of determining the access level 1 allocation criterion value, a step 1203 of determining the access level 0 allocation criterion value, a step 1301 of determining whether the allocation criterion value MAX can be set, a step 1302 of determining all cache segment allocation criterion value MAX, a step 1303 of determining whether the priority is equal, a step 1304 of distributing equal allocation criterion value, and a step 1305 of distributing the priority weight allocation criterion value (The detailed contents of processing in steps 1201-1203 are processing in steps 1301-1305).

Next, with reference to FIGS. 9-13, the overall operation of the cache memory division management system in the disk array device in this embodiment, configured as described above, will be described.

The operation of the segment information setting means 41 and the input/output management means 42 in the controller 40 of the disk array device 100 is the same as that of the segment information setting means 41 and the input/output management means 42 in the first embodiment. It should be noted, however, that the contents of information that is set in the segment management table by the segment information setting means 41 are not the allocation criterion values in the first embodiment but the maximum usage amount, minimum usage amount, and priority shown in FIG. 10. In addition, the allocation criterion values referenced by the input/output management means 42 are not the values in the segment information management table 62 but the values that are set at that time in the segment internal management table 63.

The operation of the allocation criterion value determination means 43, which is used only in this embodiment, will be described.

FIG. 11A is a diagram showing the initial status of the segment internal management table 63 when the information shown in FIG. 10 is set in the segment information management table 62.

In this initial status, the allocation criterion value determination means 43 in the controller 40 sets the allocation criterion values, 54, 23, 23, and 0 (the total is 100), for cache segments #0-#3 in the segment internal management table 63 by using the maximum usage amount values of 70, 30, 30, and 0 in the segment management table in FIG. 10 as the weight. During input/output management processing, the controller 40 performs control according to those allocation criterion values as described above.

Those allocation criterion values vary dynamically according to the access level determined by the access count value.

That is, the allocation criterion value determination means 43 determines the allocation criterion values according to the access level as described below (see FIGS. 12 and 13).

The allocation criterion value determination means 43 determines the cache segment allocation criterion values of the access levels in descending order of access level as shown in steps 1201-1203 in FIG. 12. The allocation criterion values of the cache segments at each access level are determined as shown in steps 1301-1305 in FIG. 13.

That is, the allocation criterion value determination means 43 first determines if the allocation criterion values of all cache segments at this access level (equal access level) can be set to the maximum usage amount (indicated by MAX in FIG. 13) (step 1301). In this determination processing, the allocation criterion value determination means 43 takes into consideration whether or not the total of the allocation criterion values, including the allocation criterion values of cache segments at other access levels, does not exceed 100 or whether or not the minimum usage amount values can be allocated to the cache segments at other access levels.

If it is determined in step 1301 that the allocation criterion values of all cache segments at this access level can be set to the maximum usage amount, the allocation criterion value determination means 43 determines the allocation criterion value of all cache segments at this access level as the maximum usage amount (step 1302).

On the other hand, if it is determined in step 1301 that the allocation criterion values of all cache segments at this access level cannot be set to the maximum usage amount, the allocation criterion value determination means 43 checks if the priorities of all cache segments at this access level are equal (step 1303).

If it is determined in step 1303 that the priorities of all cache segments at this access level are equal, the cache segments at this access level is allocated an equal allocation criterion value while taking into consideration that the total of the allocation criterion values, including those of cache segments at other access level, does not exceed 100 and that, if possible, a value equal to or higher than the minimum usage amount is allocated to the cache segments at other access levels (step 1304).

If the cache segments at other access levels fall below the minimum usage amounts when the total of the allocation criterion values does not exceed 100 and the cache segments at this access level are allocated an equal allocation criterion value, that value is used.

On the other hand, if it is determined in step 1303 that the priorities of all cache segments at this access level are not equal, the allocation criterion values of the cache segments at this access level are allocated according to priority weights while taking into consideration that the total of the allocation criterion values, including those of cache segments at other access level, does not exceed 100 and that at least the minimum usage amount is allocated to the cache segments at other access levels (step 1305).

As an example, how allocation criterion values are determined when the access counts and the access levels are the values shown in FIGS. 11B and 11C.

In the status shown in FIG. 11B, because cache segment #0 is frequently accessed and the access level is set to 2, the allocation criterion value for cache segment #0 is determined first in step 1201.

In this case, according to the determination in step 1301, the allocation criterion value of cache segment #0 is set to the maximum usage amount value, 70, shown in FIG. 10 (step 1302).

Next, because cache segment #1 and cache segment #2 are less frequently accessed and their access levels are 1, the allocation criterion values of those cache segments are determined in step 1202.

In this case, if the allocation criterion values of cache segment #1 and cache segment #2 are each set to 30 that is the maximum usage amount shown in FIG. 10, the total of the allocation criterion values exceeds 100 because the allocation criterion value of cache segment #0 is already determined to be 70. Therefore, based on the determination in step 1301 ("cannot be set to maximum usage amount"), the allocation criterion values of cache segment #1 and cache segment #2 must be determined such that the total is 30 or lower.

At this time, if their priorities are equal, the allocation criterion value of each cache segment is determined to be 15. However, because different priorities are specified for cache segment #1 and cache segment #2 in FIG. 10, the allocation criterion value of cache segment #1 is determined to be 20 and the allocation criterion value of cache segment #2 is determined to be 10 (step 1305) based on the determination is step 1303 (the priorities are not equal). That is, as shown in FIG. 11B, the allocation criterion values of cache segment #1 and cache segment #2 in the segment internal management table 63 are set to 20 and 10. In such a case, the weights should be decided in advance according to the priorities.

When different priorities are specified for two cache segments, the ratio of the allocation criterion value of the higher-priority cache segment (lower priority value (2 in the above example)) to the allocation criterion value of the lower-priority cache segment (higher priority value (3 in the above example)) is 2:1 in the above example, this ratio is exemplary and may be changed to other ratios.

Finally, in step 1203, the allocation criterion value of cache segment #3, whose access level is 0, is determined to be 0 (As shown in FIG. 10, the maximum usage amount of cache segment #3 is 0).

FIG. 11C shows the status in which the status of cache segment #0 has been changed from that in FIG. 11B and no access is made to that segment.

In this status, the allocation criterion values of cache segment #1 and cache segment #2, whose access level is 1, are determined first in step 1202.

In this case, based on the determination in step 1301 and the processing in step 1302, the allocation criterion values of cache segment #1 and cache segment #2 are each determined to be 30, which is the maximum usage amount shown in FIG. 10.

Next, the remaining value of 40 (100 minus 2×30) is allocated to cache segment #0 in step 1203 (The allocation criterion value of cache segment #3 is 0 as in FIG. 11B).

An allocation criterion value must always be equal to or higher than the minimum usage amount. In the cases described above, there is no problem because all allocation criterion values are higher than the minimum usage amount. If the minimum usage amount of cache segment #0 is 50, this must be taken into consideration when the allocation criterion values of cache segment #1 and cache segment #2 are determined in FIG. 11C. That is, the total of the allocation criterion values of cache segment #1 and cache segment #2 is adjusted such that the total is 50 or lower.

(4) Modification of Second Embodiment

As in the first embodiment, the modification such as the one shown in (2) above is possible also for the second embodiment. That is, instead of the port via which a command is received, the logical disk number specified by the command or the host ID of the host from which the command is issued may be used as the access group determination condition. That is, instead of the port management table, the logical disk management table (table indicating the correspondence between logical disks and cache segments) and the host management table (table indicating the correspondence between hosts and cache segments) may be used for the access group management table.

(5) Third Embodiment

Figure 14:
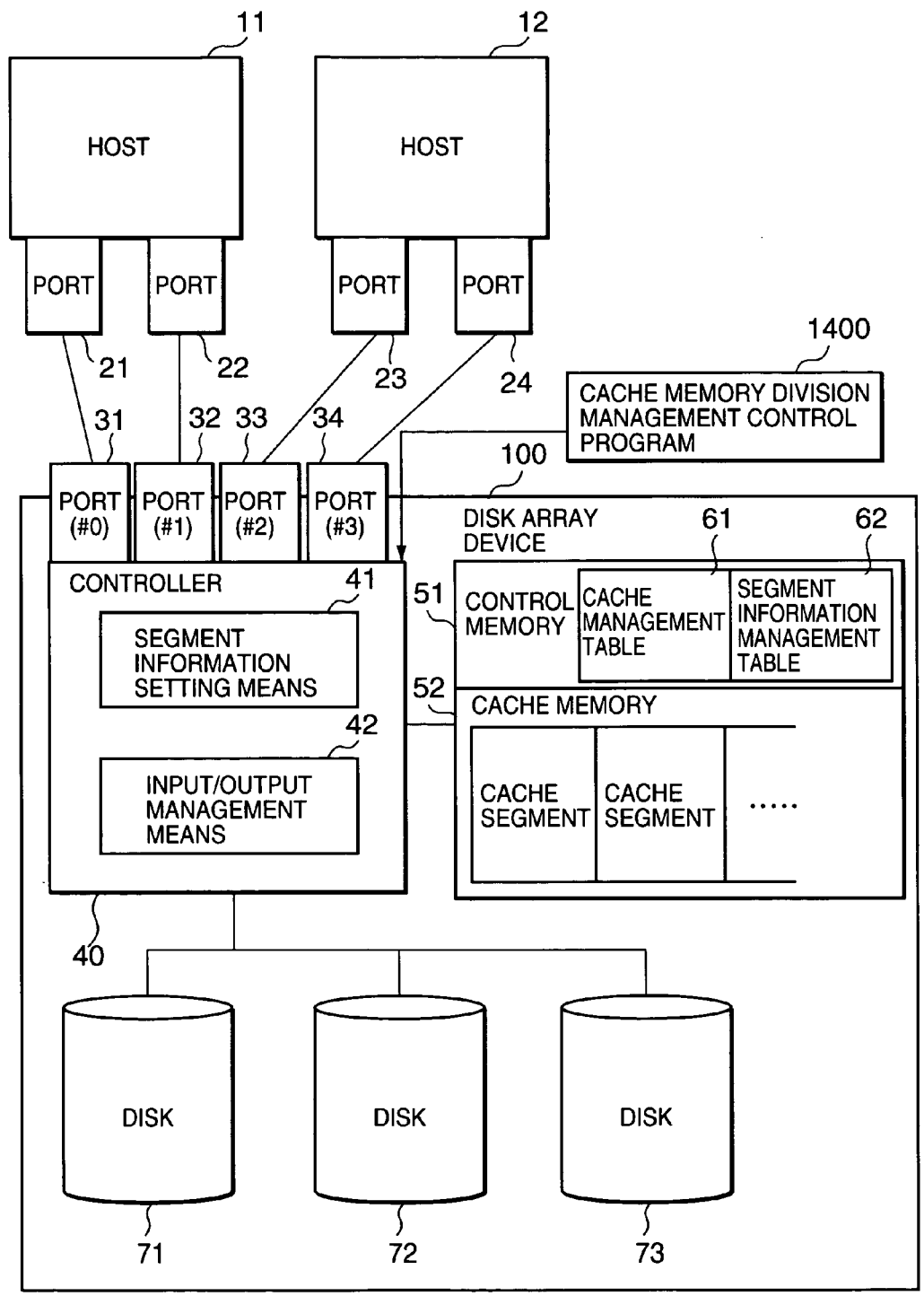
FIG. 14 is a block diagram showing the configuration of a third embodiment of the present invention.

FIG. 14 is a block diagram showing the configuration of a third embodiment of the present invention.

Referring to FIG. 14, a cache memory division management system in a disk array device in the third embodiment of the present invention is similar to the cache memory division management system in the disk array device in the first embodiment shown in FIG. 1 except that a cache memory division management control program 1400 is added.

The cache memory division management control program 1400, which is read into a disk array device 100, functions as a controller 40 (segment information setting means 41 and input/output management means 42) to control the operation of the disk array device 100. The operation of the disk array device 100 (the operation of the controller 40 assuming that control memory 51 and cache memory 52 are present) controlled by the cache memory division management control program 1400 is exactly the same as that of the controller 40 (segment information setting means 41 and input/output management means 42) in the first embodiment and, therefore, its detailed description is omitted.

(6) Fourth Embodiment

Figure 15:
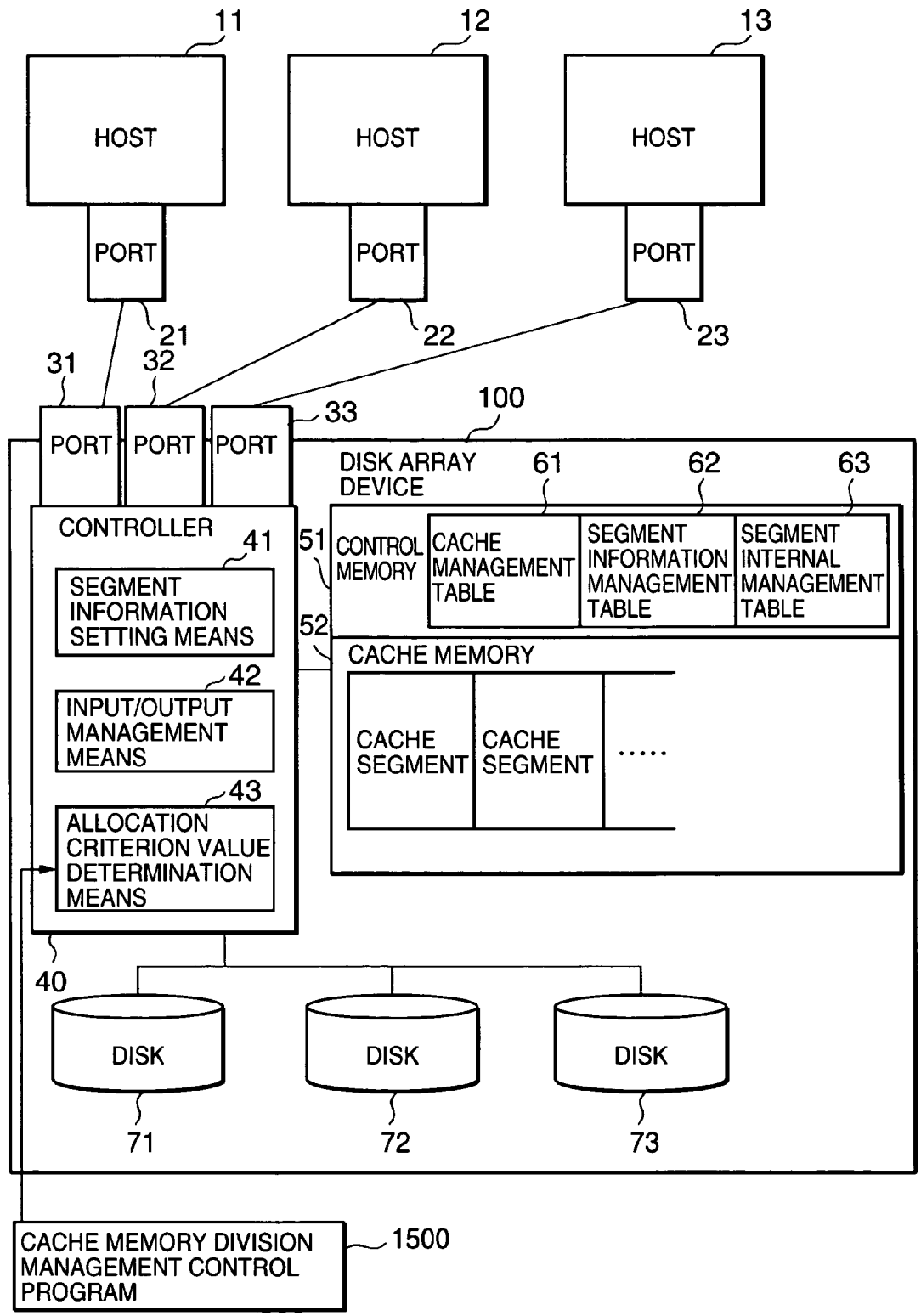
FIG. 15 is a block diagram showing the configuration of a fourth embodiment of the present invention.

FIG. 15 is a block diagram showing the configuration of a fourth embodiment of the present invention.

Referring to FIG. 15, a cache memory division management system in a disk array device in the fourth embodiment of the present invention is similar to the cache memory division management system in the disk array device in the second embodiment shown in FIG. 9 except that a cache memory division management control program 1500 is added.

The cache memory division management control program 1500, which is read into a disk array device 100, functions as a controller 40 (segment information setting means 41, input/output management means 42, and allocation criterion value determination means 43) to control the operation of the disk array device 100. The operation of the disk array device 100 (the operation of the controller 40 assuming that control memory 51 and cache memory 52 are present) controlled by the cache memory division management control program 1500 is exactly the same as that of the controller 40 (segment information setting means 41, input/output management means 42, and allocation criterion value determination means 43) in the second embodiment and, therefore, its detailed description is omitted.

According to the present invention, a cache is divided in advance according to access groups as described above. Thus, even if one host (sometimes an application rather than a host) issues data requests one after another that do not cause a cache hit and discards old data, data in the cache memory accessed by another host is protected because the cache is divided and therefore, when the host accesses the data, a cache hit is likely to occur. That is, the present invention has an effect that, in a disk array device, the cache hit rate of one host is not affected by the access pattern of another host.

The disk array device according to the present invention allows the division size criterion values (allocation criterion values in percentage) or the correspondence between access groups and cache segment identifiers (cache segment numbers) to be set or changed dynamically even during the operation of the disk array device, thus making it possible to dynamically and immediately change the cache segment division status of the disk array device. Therefore, not only when the system is built but also when hosts or applications are changed or deleted later and the optimum settings are changed, the disk array device according to the present invention can react to the change appropriately and allows the optimum values to be set again without stopping the system to immediately reflect the change for improved management.

While this invention has been described with reference to illustrative embodiments, this description is not intended to be construed in a limiting sense. Various modifications of the illustrative embodiments as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A disk array device having cache memory and accessed by hosts, wherein cache segment identifiers and access groups are defined for managing the cache memory by dividing all area of said cache memory into a plurality of cache segments, each corresponding to an access group, said disk array device comprising:

a segment information management table comprising a segment management table that manages, for each cache segment identifier, a division size criterion value for the cache segment; and an access group management table that manages information on a correspondence between the access groups and the cache segments;

a cache management table managing information on a link status of LRU (Least Recently Used) links provided one for each cache segment for controlling data discarding from the cache memory;

segment information setting means that sets information in said segment information management table based on a setting command from a host; and input/output management means that, based on settings in said segment information management table and the link status of LRU links corresponding to the cache segments managed in said cache management table, identifies to which access group an input/output request from a host corresponds and that, considering a division size allocated to each cache segment, controls discarding data from the cache memory of each cache segment;

wherein data is discarded from a first cache segment that stores data in excess of an allocation criterion value associated with the first cache segment, and wherein data is newly written to a second cache segment based on a determination that the second cache segment stores less data than an allocation criterion value associated with the second cache segment.

2. The disk array device according to claim 1, wherein said segment management table in said segment information management table contains allocation criterion values, each of which indicates in percentage a fixed usage amount allocated to each cache segment, as division size criterion values, and wherein said access group management table in said segment information management table contains information on a correspondence between access group identification information and cache segment numbers and wherein said input/output management means determines an access group corresponding to an input/output command from a host, references said access group management table to identify a cache segment allocated to the access group, references said segment management table to identify the allocation criterion value of each cache segment, references said cache management table to determine a data allocation amount of each cache segment at this moment, determines a cache segment from which data is to be discarded based on the determination and the identification, and controls discarding data from, and storing data into, the cache memory.

3. A disk array device having cache memory and accessed by hosts, wherein cache segment identifiers and access groups are defined for managing the cache memory by dividing all area of said cache memory into a plurality of cache segments, each corresponding to an access group, said disk array device comprising:

a segment information management table comprising a segment management table that manages, for each cache segment identifier, variable division size criterion values for the cache segment; and an access group management table that manages information on a correspondence between the access groups and the cache segments;

a cache management table managing information on a link status of LRU links provided one for each cache segment for controlling data discarding from the cache memory;

a segment internal management table that manages frequencies of access to the cache segments for controlling a dynamic change in division sizes based on an access pattern of a host and maintains information on the division sizes currently allocated to the cache segments;

segment information setting means that sets information in said segment information management table based on a setting command from a host;

input/output management means that, based on settings in said segment information management table, the link status of LRU links corresponding to the cache segments managed in said cache management table, and information on current division sizes stored in said segment internal management table, identifies to which access group an input/output request from a host corresponds and that, considering a division size allocated to each cache segment, controls discarding data from the cache memory of each cache segment; and allocation criterion value determination means that determines a division size to be allocated to each cache segment based on the access frequencies managed in said segment internal management table and the variable division size criterion values stored in said segment management table;

wherein data is discarded from a first cache segment that stores data in excess of an allocation criterion value associated with the first cache segment, and wherein data is newly written to a second cache segment based on a determination that the second cache segment stores less data than an allocation criterion value associated with the second cache segment.

4. The disk array device according to claim 3, wherein said segment management table in said segment information management table contains maximum usage amounts and minimum usage amounts, which indicate variable usage amounts, and priorities for the cache segments as variable division size criterion values, wherein said access group management table in said segment information management table contains information on a correspondence between access group identification information and cache segment numbers and said segment internal management table contains access counts and access levels, which are information on managing access frequencies, and allocation criterion values which indicate current division sizes, wherein said input/output management means determines an access group corresponding to an input/output command from a host, references said access group management table to identify a cache segment allocated to the access group, references said segment internal management table to identify current allocation criterion values of the cache segments, references said cache management table to determine a data allocation amount of each cache segment at this moment, determines a cache segment from which data is to be discarded based on the determination and the identification, and controls discarding data from, and storing data into, the cache memory, and wherein said allocation criterion value determination means references said segment management table and said segment internal management table to determine a cache segment allocation criterion value of a cache segment at each access level within a range of the maximum usage amount and the minimum usage amount in descending order of access levels and, for a distribution of allocation criterion value between cache segments at an equal access level, takes into consideration the priorities of the cache segment.

5. The disk array device according to claim 1, wherein a setting change in the information in the segment information management table can be made dynamically by a setting command from a host and wherein the division size of each cache segment can be changed dynamically by changing the link status of LRU links of the cache segments managed in the cache management table while reflecting the setting change during input/output processing that is executed after the setting change.

6. The disk array device according to claim 3, wherein a setting change in the information in the segment information management table can be made dynamically by a setting command from a host and wherein the division size of each cache segment can be changed dynamically by changing the link status of LRU links of the cache segments managed in the cache management table while reflecting the setting change during input/output processing that is executed after the setting change.

7. The disk array device according to claim 1, wherein the access group is allocated according to a port via which a command is received and a port management table is used as the access group management table.

8. The disk array device according to claim 3, wherein the access group is allocated according to a port via which a command is received and a port management table is used as the access group management table.

9. The disk array device according to claim 1, wherein the access group is allocated according to a logical disk number specified by a command and a logical disk management table is used as the access group management table.

10. The disk array device according to claim 3, wherein the access group is allocated according to a logical disk number specified by a command and a logical disk management table is used as the access group management table.

11. The disk array device according to claim 1, wherein the access group is allocated according to a host ID of a host from which a command is issued and a host management table is used as the access group management table.

12. The disk array device according to claim 3, wherein the access group is allocated according to a host ID of a host from which a command is issued and a host management table is used as the access group management table.

13. A method of managing cache memory of a disk array device, which is accessed by hosts, by dividing the cache memory, comprising the steps of:

A. defining cache segment identifiers and access groups to manage the cache memory by dividing all area of said cache memory into a plurality of cache segments each corresponding to an access group, said access group being a group set up by a condition that can be determined by information included in a command specifying input/output;

B. receiving, by a controller in said disk array device, a command specifying input/output from said host;

C. determining which access group corresponds to the command;
D. identifying a cache segment allocated to the access group;
E. referencing a segment management table to identify allocation criterion values of the cache segments;
F. determining current data allocation sizes of the cache segments;
G. based on steps C, D, E, and F, determining a cache segment from which data is to be discarded; and
H. based on the determination in step G, discarding data from, or storing data into, the cache memory;
wherein data is discarded from a first cache segment that stores data in excess of an allocation criterion value associated with the first cache segment, and wherein data is newly written to a second cache segment based on a determination that the second cache segment stores less data than an allocation criterion value associated with the second cache segment.

14. The method of managing cache memory of a disk array device by dividing the cache memory according to claim 13,
wherein, in step F, a determination is made how much data is connected to each cache segment LRU link,
wherein, in step G, a determination is made that, if the allocation criterion value of the cache segment is not exceeded even when new data is stored in the cache segment without discarding data, data is not discarded from the cache segment and, if the allocation criterion value of the cache segment is exceeded when new data is stored in the cache segment without discarding data, data is discarded from the cache segment if data discarding is required.

15. A program embodied in a computer readable medium, said program enabling a controller to execute each step as claimed in claim 13.

16. A method of managing cache memory of a disk array device, which has cache memory and is accessed by hosts, by dividing the cache memory, comprising the steps of:
A. defining cache segment identifiers and access groups to manage the cache memory by dividing all area of said cache memory into a plurality of cache segments each corresponding to an access group, said access group being a group set up according to a condition that can be determined by information included in a command specifying input/output;
B. receiving, by a controller in said disk array device, a command specifying input/output from said host;
C. determining which access group corresponds to the command;
D. identifying a cache segment allocated to the access group;
E. storing information into a segment internal management table to perform dynamic change control of division sizes based on an access pattern from the host, said information managing frequencies of access to the cache segments and indicating division sizes currently allocated to cache segments;
F. determining values indicating division sizes to be allocated to the cache segments based on the access frequencies managed in said segment internal management table and on variable division size criterion values in a segment management table that manages, for each cache segment identifier, variable division size criterion values for the cache segment; and
G. identifying to which access group the input/output request from the host corresponds, based on setting contents in said segment management table, a link status of LRU links each corresponding to a cache segment managed in said cache management table, and the information indicating the current division sizes in said segment internal management table and, while taking into consideration the division sizes allocated to the cache segments, controlling discarding data from the cache memory for each cache segment;
wherein data is discarded from a first cache segment that stores data in excess of an allocation criterion value associated with the first cache segment, and wherein data is newly written to a second cache segment based on a determination that the second cache segment stores less data than an allocation criterion value associated with the second cache segment.

17. A program embodied in a computer readable medium, said program enabling a controller to execute each step as claimed in claim 16.

* * * * *